United States Patent [19]

Presto

[11] Patent Number: 4,608,305
[45] Date of Patent: Aug. 26, 1986

[54] BINDER AND SHOEBOARD PRODUCTS CONTAINING THREE HEAT REACTIVE RESINS

[75] Inventor: Alphonse R. Presto, Holyoke, Mass.

[73] Assignee: Texon, Inc., Farmington, Conn.

[21] Appl. No.: 621,936

[22] Filed: Jun. 18, 1984

[51] Int. Cl.$^4$ ...................... C08L 33/08; D06M 21/00
[52] U.S. Cl. ......................................... 428/365; 36/43;
428/393; 428/394; 525/218; 525/221; 525/227;
525/230; 525/233; 525/237
[58] Field of Search ............... 524/501, 522, 523, 521;
525/218, 221, 227, 233; 428/290, 365, 393, 394;
36/43

[56] References Cited

U.S. PATENT DOCUMENTS

| | | | |
|---|---|---|---|
| 3,193,446 | 7/1965 | Eisenberg | 525/218 |
| 3,998,768 | 12/1976 | Pettit | 524/523 |
| 4,331,738 | 5/1982 | Kuan | 525/218 |
| 4,507,357 | 3/1985 | Lester | 428/290 |

FOREIGN PATENT DOCUMENTS 7013375  3/1971 Netherlands ...................... 525/218

Primary Examiner—Wilbert J. Briggs, Sr.
Attorney, Agent, or Firm—Thomas S. Szatkowski

[57] ABSTRACT

Novel, improved binders comprising a combination of heat reactive polymers. The novel binders are especially useful as saturants for fibrous sheet materials to provide high quality shoeboard materials.

10 Claims, No Drawings

BINDER AND SHOEBOARD PRODUCTS CONTAINING THREE HEAT REACTIVE RESINS

THE FIELD OF THE INVENTION

This invention relates to novel, improved binder systems especially useful in the manufacture of shoeboard and to novel, improved shoeboard materials.

DESCRIPTION OF THE PRIOR ART

"Shoeboard" is a synthetic sheet material commonly used in the footwear art for the production of footwear counters and insoles. Shoeboard materials widely used in the art include a fibrous sheet material which is impregnated with a Neoprene binder. These shoeboard materials are especially useful in providing high quality insoles presenting the desirable combination of performance characteristics of firmness, flexibility, high tensile strength, high internal bond strength and excellent overall dimensional stability. Examples of shoeboard materials of the type described above are sold commercially by EMHART Corporation under the TEXON Trademark. Shoeboard materials designated as TEXON Type 437, TEXON type 480 and similar TEXON type shoeboard materials comprise a cellulosic fibrous sheet material impregnated with an elastomeric Neoprene binder and are used in the manufacture of cement last shoes, injection molded shoes and in slush molded shoes. These shoeboard materials provide insoles which have excellent firmness and shape retention and are especially suitable for athletic footwear products. Shoeboard materials of the type described above usually comprise from about 1 to about 35 percent by weight Neoprene binder based on the total weight of the shoeboard. Usually, the shoeboard materials comprise a minor amount of styrene butadiene binder such as between about 1 to about 10 percent by weight to improve modules or rigidity.

As those in the art know, shoeboard has been traditionally assigned a low cost status in the footwear industry and cost effectiveness is a crucial consideration for commercial shoeboard manufacturers. Significant cost effectiveness has been achieved in the manufacture of shoeboard by the use of paper making techniques to provide commercial shoeboard materials. The conventional manufacture of shoeboard materials by way of paper making techniques essentially involves forming a furnish of fibrous materials, forming the furnish into a web, saturating or impregnating the web with a polymeric binder and drying the saturated web. As mentioned, Neoprene binders are used in the manufacture of shoeboard by paper making techniques and provide high quality shoeboard materials having an extremely desirable combination of performance characteristics. However, Neoprene binders are relatively expensive and the cost of Neoprene binders has limited the use of Neoprene binders containing shoeboard to the premium, more expensive line of footwear products. Accordingly, there is an outstanding need in the art for relatively inexpensive binders which would provide shoeboard materials having performance characteristics substantially similar to those achieved with Neoprene binders. This invention is addressed to that need and provides an effective solution for that need.

BRIEF DESCRIPTION OF THE INVENTION

The novel, improved binders of the present invention include a combination of heat reactive copolymers. The binders of the invention are effectively comparable in performance to Neoprene binders presently used in the manufacture of shoeboard. Shoeboard materials comprising fibrous sheet materials saturated with binders of this invention provide substantially the same combination of performance characteristics as achieved with the use of Neoprene binders.

DETAILED DESCRIPTION OF PREFERRED EMBODIMENTS

In its broadest form, the invention presents to the art novel, improved binder systems particularly suitable in the manufacture of shoeboard. Essentially, the novel binder system comprises a dispersion of three heat reactive copolymers. As used here, "heat reactive copolymer" means that the copolymer includes the polymerized residue of a monomer providing crosslinking groups activatable usually at elevated temperatures to provide bonding between the copolymer chain to another copolymer chain and/or between the copolymer chain and the fiber to provide a shoeboard of high internal bond strength. Polymerizable monomers providing such cross-linking groups are referred to hereafter as "functional monomers". Preferred functional monomers are the polymerizable monomers providing acid groups, hydroxyl groups and alkylol groups such as are provided by acrylic acids, carboxylic acids or derivatives of these acids, hydroxy alkyl methacrylates, and acrylamides including alkyl or alkylol acrylamides. The preferred heat reactive copolymers include up to about 5 percent by weight functional monomer(s) and preferably from about 0.5 to about 4 percent by weight functional monomer(s).

One heat reactive copolymer of the binders of the present invention is a heat reactive acrylic copolymer produced by the copolymerization of acrylic monomers such as acrylates including alkyl acrylates, methacrylates and acrylonitriles and functional monomer(s). Preferred heat reactive acrylic copolymers are those comprising from about 60 to about 85 percent by weight of the copolymer of acrylate, from about 5 to about 15 percent by weight methacrylate, from about 3 to about 10 percent by weight acrylonitrile and from about 0.5 to about 5 percent by weight of functional monomer(s). A commercially available acrylic copolymer of the type described above is sold by Derby Company under the designation DERCRYL 836 SR and comprises about 70 to about 80 percent by weight ethyl acrylate, from about 7 to about 13 percent by weight methyl methacrylate, from about 4 to about 8 percent by weight acrylonitrile, from about 0.5 to about 4 percent by weight of functional monomers including alkylol acrylamide and/or an acrylamide and/or methacrylic acid or derivatives of methacrylic acid and mixtures of these.

The binders of the invention also include two copolymers containing the polymerized residue of one or more "hard" and one or more "soft" monomers and up to about 5 percent by weight of functional monomer(s). One of the copolymers comprises from about 40 to about 60 percent by weight hard monomer while the other copolymer comprises from about 60 to about 90 percent by weight hard monomer. Preferred hard monomers are styrene and derivatives of styrene such as alpha methyl styrene but other hard monomers such as the acrylates and the methacrylates can be copolymerized with the preferred hard monomers. Preferred soft monomers are the conjugated dienes containing from 4-8 carbon atoms and butadiene is particularly preferred. Preferred copolymers containing the lower percentage by weight of hard monomer(s) comprise from about 40-60 percent by weight styrene, up to about 5 percent by weight functional monomer(s) and butadiene in the percent by weight amount remaining. A commercially available copolymer of the type described above is sold by Polysar Corporation under the designation POLYSAR PL 1084 and comprises approximately equivalent percentages by weights of styrene and butadiene and up to about 5 percent by weight N methylol acrylamide. Preferred copolymers containing the higher percentage by weight hard monomer(s) comprise from about 60 to about 90 percent by weight styrene, up to about 5 percent by weight functional monomer(s) and butadiene in the percent by weight amount remaining. A commercially available copolymer of the type described above is a copolymer solid by Goodyear Company under the designation LPR 4577C and includes about 85 percent by weight styrene, about 15 percent by weight butadiene and about 2 percent by weight of functional monomer(s) such as carboxylic acid and/or a derivative of carboxylic acid.

The respective amounts of the copolymers of the binders of the invention can vary. Preferred binders are those comprising from about 20 to about 45 percent by weight based on the total dry weight of copolymers of acrylic copolymer, from about 35 to about 65 percent by weight of the copolymer comprising the lower percentage by weight of hard monomer and from about 3 to about 18 percent by weight of the copolymer comprising the higher percentage by weight hard monomer. Especially preferred binders are those comprising from about 28 to about 38 percent by weight acrylic copolymer from about 50 to about 60 percent by weight of the copolymer comprising the lower percentage by weight hard monomer(s) and from about 6 to about 13 percent by weight of the copolymer comprising the higher percentage by weight of hard monomer(s). The binders are used in the form of dispersions, preferably as aqueous or partially aqueous dispersions and most preferably in the form of a latex. Water dispersions or emulsions of the copolymers comprising from about 30 to about 60 percent by weight copolymer based on total weight of the dispersion are preferred.

Binders of the invention can be suitably used as saturants for the various fibrous webs used in shoeboard manufacture. Such webs include those comprising natural as well as synthetic fibers or mixtures of such fibers. Preferred webs comprise cellulosic fibers such as ordinary purified or non-purified kraft cooked fibers or non-purified or purified sulfite cooked wood cellulose fibers such as the high alpha sulfite types used as nitration grade, as well as jute, kemp, mercerized kraft and the like. Webs comprising synthetic fibers such as acrylic, polyester, polyamide and like fibers can be saturated with binders of the present invention. In the preferred practice of the present invention, the binders are used to saturate shoeboard webs comprising about twenty percent or less by weight synthetic fibers based on total fiber weight.

The shoeboard of the invention is formed on conventional paper making apparatus and in accordance with standard paper making techniques. Essentially the pulp is added to a pulper together with water and conventional auxiliary paper making chemicals such as dyes, wet strength agents and the like to provide a furnish. The furnish is fed to a web forming machine such as a Fourdrinier or a Rotoformer and the web is then saturated with the binder, dried and calendered to the desired thickness. Preferred shoeboard thicknesses are between about 0.020 to about 0.150 inches. If desired, shoeboard materials of the invention can be coated on one or both surfaces with thin layers of polymeric materials for aesthetics purposes such as to improve the appearance or feel of the material.

Binders of the present invention can be employed in conventional wet web saturating equipment and applied according to conventional wet web saturating techniques. The amount of saturant applied to a shoeboard web is usually referred to in the art as the "saturant pick-up". In the preferred practice of the invention, the saturant pick-up is controlled in known manners to provide between about 15 to about 50 percent by weight copolymer (or somewhat higher) based on the total weight of the finished, dry shoeboard.

An especially preferred binder formulation of the invention is described below:

| Binder A. | |
|---|---|
| | Parts by wt. (dry) |
| Acrylic Binder Latex (DERCRYL 836 SR) | 58 |
| Lower Styrene Containing Binder Latex (POLYSAR PL 1084) | 100 |
| High Styrene Containing Binder Latex (LPR 4577C) | 16 |
| Surfactant | 1 |
| Fungicide | |

The above binder formulation was prepared by mixing the listed ingredients together in a compound tank until a uniform binder dispersion is obtained.

Further details of the invention and of means of making and using the invention are presented in the illustrative examples which follow.

EXAMPLE 1

This example relates to the preparation of a shoeboard material containing a fibrous sheet material saturated with a Neoprene binder.

A furnish composed of the following ingredients was prepared:

| Ingredient | |
|---|---|
| Softwood Kraft Pulp | 2000 lbs. |
| Dyes | 1070 cc |
| Aluminum Sulfate | 17 lbs. |
| Soda Ash | 4.5 lbs. |

The above furnish was charged to a pulper and 29,000 lbs of water added. The ingredients were agitated in the pulper until a uniform slurry was obtained. The slurry was pumped to the machine chest of a Fourdrinier papermaking machine and then pumped to the head box of the Fourdrinier. The slurry was fed onto the moving screen of the Fourdrinier, water was drained by gravity and then suction was applied to provide a fibrous web. The fibrous web was saturated with a binder which included a Neoprene latex binder. The Neoprene latex binder contained 58-60 percent by weight solids, had a pH of 12.5 and a viscosity of 100 cps and a minor amount of a styrene butadiene latex binder. The web was dried and calendered to 0.077 inch to provide a shoeboard material containing about 21.65 percent by weight Neoprene binder and 5.36 percent by weight styrene butadiene binder based on the total weight of dry shoeboard.

EXAMPLE 2

Example 1 was repeated except that the Neoprene latex binder was replaced with Binder A described before. The formed web was saturated with Binder A, dried and calendered to 0.077 inch to provide a shoeboard containing about 27 percent by weight Binder A based on the total weight of the dry shoeboard.

EXAMPLE 3

Table below summarizes the properties of insoles cut from the shoeboards of Examples 1 and 2.

TABLE 1

| Shoeboard Binder | Example 1 Neoprene | Example 2 Binder A. |
|---|---|---|
| Tensile | 280 × 180 | 385 × 211 |
| Elongation | 7.0 × 13.0 | 8.7 × 13.5 |
| Edge Tear | 90 × 90 | 100 × 95 |
| Stiffness | 2275 × 1225 | 2190 × 1090 |
| Internal Bond | 2600 × 2100 | 2960 × 2150 |
| Tape Mullen | 240 | 255 |
| Wet Abrasion Strength | 26 × 31 | 60 × 88 |
| Flex | 6000 × 4000 | 4204 × 1635 |
| Stitch | 30 × 30 | 25 × 39 |

The above comparative data demonstrates that the shoeboard materials are substantially equivalent in terms of their overall performance characteristics. Actually, in terms of Tensile, Elongation, Edge Tear and Internal Bond, the shoeboard saturated with Binder A demonstrates improved performance characteristics as compared with the Neoprene latex saturated shoeboard material. The most significant difference between the shoeboard materials is the almost three fold improvement of Wet Abrasion Strength measured for the shoeboard saturated with Binder A. Wet Abrasion Strength is a measure of the durability of insoles and the binders of the present invention provide insoles of suprisingly superior Wet Abrasion Strengths.

What claimed is:

1. A binder for shoeboard material comprising a dispersion of three heat reactive copolymers including:
   (a) from about 20 to about 45 percent by weight, based on the total weight of copolymers, of a copolymer which comprises:
      (i) about 70 to about 80 percent by weight of ethyl acrylate,
      (ii) about 7 to about 13 percent by weight of methyl methacrylate,
      (iii) about 4 to about 8 percent by weight of acrylonitrile, and
      (iv) about 0.5 to about 4 percent by weight of a functional monomer which comprises acrylamide, N alkylol acrylamide, methacrylic acid, derivatives of methacrylic acid or mixtures of these;
   (b) from about 35 to about 65 percent by weight, based on the total weight of copolymers, of a copolymer which comprises:
      (i) styrene and butadiene in approximately equivalent percentages by weight, and
      (ii) N methylol acrylamide in an amount up to about 5 percent by weight; and
   (c) from about 3 to about 18 percent by weight, based on the total weight of copolymers, of a copolymer which comprises:
      (i) about 85 percent by weight styrene;
      (ii) about 15 percent by weight butadiene; and
      (iii) about 2 percent by weight of carboxylic acid and/or a derivative of carboxylic acid.

2. A binder of claim 1 where the copolymers are dispersed in an aqueous or partially aqueous medium.

3. A binder of claim 2 where the dispersion of binder comprises from about 30 to about 60 percent by weight of copolymers based on the total weight of the dispersion.

4. A binder of claim 1 where the copolymer (a) is present in an amount between about 28 to about 38 percent by weight; the copolymer (b) is present in an amount between about 50 to about 60 percent by weight; and the copolymer (c) is present in an amount between about 6 to about 13 percent by weight.

5. A shoeboard material comprising a fiberous sheet material impregnated with a binder comprising a dispersion of three heat reactive copolymers including:
   (a) from about 20 to about 45 percent by weight, based on the total dry weight of copolymers, of a copolymer which comprises:
      (i) about 70 to about 80 percent by weight of ethyl acrylate,
      (ii) about 7 to about 13 percent by weight of methyl methacrylate,
      (iii) about 4 to about 8 percent by weight of acrylonitrile, and
      (iv) about 0.5 to about 4 percent by weight of a functional monomer which comprises acrylamide, N alkylol acrylamide, methacrylic acid, derivatives of methacrylic acid or mixtures of these;
   (b) from about 35 to about 65 percent by weight, based on the total dry weight of copolymers, of a copolymer which comprises:
      (i) styrene and butadiene in approximately equivalent percentages by weight, and
      (ii) N methylol acrylamide in an amount up to about 5 percent by weight; and
   (c) from about 3 to about 18 percent by weight, based on the total dry weight of copolymers, of a copolymer which comprises:
      (i) about 85 percent by weight styrene;
      (ii) about 15 percent by weight butadiene; and
      (iii) about 2 percent by weight of carboxylic acid and/or a derivative of carboxylic acid.

6. A shoeboard material of claim 5 where the binder represents from about 15 to about 60 percent by weight of the shoeboard material.

7. A shoeboard material of claim 5 where the fibrous sheet material comprises cellulosic fibers and up to about 20 percent by weight synthetic fibers based on total weight of fiber.

8. A shoeboard material of claim 5 where the copolymer (a) is present in an amount between about 28 to about 38 percent by weight; the copolymer (b) is present in an amount between about 50 to about 60 percent by weight; and the copolymer (c) is present in an amount between about 6 to about 13 percent by weight.

9. A shoeboard material of claim 5 where the fiberous sheet material comprises cellulosic fibers.

10. A shoeboard material of claim 5 where the fiberous sheet material comprises synthetic fibers.

* * * * *